3,080,423
PROCESS FOR THE MANUFACTURE OF THE ACID-ADDITION SALTS OF N-BUTYL-BIGUANIDE
Gerhard Proske, Stolberg, Rhineland, Heinrich Mueckter, Aachen, Gerhard Osterloh, Stolberg, Rhineland, and Hans-Werner von Schrader-Beielstein, Aachen, Germany
No Drawing. Filed Aug. 10, 1959, Ser. No. 832,459
Claims priority, application Germany Aug. 20, 1958
5 Claims. (Cl. 260—564)

The present invention relates to the new and valuable n-butyl-biguanide and its salts and to a process for the manufacture of these compounds.

Alkylbiguanides and their salts have been prepared by melting together dicyandiamide and salts of amines. However the yields in this process are very low. Therefore the alkylbiguanides and especially the monoalkylbiguanides are usually prepared by carrying out the reaction in the presence of a copper salt, whereby the product is obtained in the form of a stable copper complex salt. By treatment of this copper complex salts for example with hydrogen sulphide the copper therein is precipitated and can be removed by filtration. From the filtrate the biguanide salt is isolated. In a technical scale this process is not practicable because of the difficulty of isolation of the products. Moreover the yield is in most cases low when following this method. For example there are obtained only 4 g. of propylbiguanidesulfate (this is 21% of the theoretical yield) from 6 g. propylamine (cf. Houben Weyl, Methoden der organischen Chemie, 4th Ed., vol. VIII (1952) page 216).

According to the present invention n-butylbiguanide and its salts are obtained with good yields without preparing an intermediate compound by a modified melting process. This process consists of melting together a butylamine salt and dicyandiamide and treating the melt thus obtained with a lower aliphatic ketone, containing 3 to 9 carbon atoms. The coloured byproducts and impurities are dissolved in the ketone whereas the n-butylbiguanide salt is insoluble in the solvent and is thus obtained practically pure in form of white crystals.

Preferably the melt is introduced into the ketone while hot. In view of the fact that the products of the present invention may be used as therapeutics it may be desirable to purify the material isolated from the melt. This may be done by dissolving the n-butylbiguanide salt in a lower aliphatic alcohol, for example isopropanol, and introducing this solution into a lower aliphatic ketone. Thereby the last traces of impurities are removed.

The n-butyl biguanide and its salts, especially its hydrochloride, have properties valuable in the treatment of diabetes mellitus. Their application results in a lowering of blood sugar levels.

The following examples serve to illustrate the present invention without however limiting the same thereto.

*Example 1*

252.4 g. of n-butylamine hydrochloride are mixed with 194 g. of dicyandiamide and while being stirred vigorously this mixture is quickly heated. At about 100° C. the mixture melts. The melt is heated for 1 hour to 150° C. Thereafter the melt while still hot is added under vigorous stirring to 2 liters of acetone, cooled with ice. During this operation the n-butylbiguanide hydrochloride separates in the form of white crystals. The product is filtered off and washed with acetone. The yield is 180 g.=40.5% of the theoretical. Melting point 177° C.

*Example 2* n-Butylamine hydrochloride and dicyandiamide are melted together as described in Example 1. After cooling the melt to 100–110° C. it is triturated while stirring with hot methyl-iso-butylketone and then quickly cooled. After filtering off the white n-butylbiguanide hydrochloride it is washed with acetone. The yield is 175 g.=39% of the theoretical.

In place of the n-butylbiguanide hydrochloride mentioned hereinabove salts of the n-butylbiguanide with other acids as for instance hydrobromic acid, hydroiodic acid, hydrofluoric acid, sulfuric acid, phosphoric acid and others can be produced in an analogous manner. These acids are pharmaceutically acceptable acids.

We claim:

1. In a process of producing a substantially purse salt of n-butyl biguanide with a pharmaceutically acceptable acid, the steps of melting a salt of n-butylamine and said acid jointly with dicyandiamide and contacting the resulting melt with an alkanone containing three to nine carbon atoms.

2. In a process according to claim 1, wherein said melt is contacted with said ketone while hot.

3. In a process of producing a substantially pure salt of n-butylbiguanide, the steps of melting a salt of n-butylamine and an acid selected from the group consisting of hydrochloric, hydrobromic, hydroiodic, hydrofluoric, sulfuric, and phosphoric acids, jointly with dicyandiamide and contacting the resulting melt with an alkanone containing three to nine carbon atoms.

4. In a process of producing substantially pure n-butyl biguanide hydrochloride the steps of melting together n-butyl amine hydrochloride and dicyandiamide and treating the resulting melt, while hot, with an alkanone containing 3 to 9 carbon atoms.

5. In a process of producing substantially pure n-butyl biguanide hydrochloride, the steps of melting together equimolecular amounts of n-butylamine hydrochloride and dicyandiamide and treating the resulting melt, while hot, with acetone.

References Cited in the file of this patent

UNITED STATES PATENTS

| | | |
|---|---|---|
| 2,149,709 | Rein | Mar. 7, 1939 |
| 2,455,897 | Nagy | Dec. 7, 1948 |
| 2,475,081 | Curd et al. | July 5, 1949 |

OTHER REFERENCES

Shapiro et al.: J.A.C.S., 79, 5064–6071 (1957) . . . 260–564.

Emich: Monatsheft fur Chemie, vol. 12 (1891), pages 5–22, page 7 relied on.

Beilstein, Handbuch der Organischen Chemie, vol. 4, (1922), pages 168–169.

(Copies in Library.)